(12) United States Patent
Abe et al.

(10) Patent No.: US 9,687,911 B2
(45) Date of Patent: Jun. 27, 2017

(54) METHOD FOR MANUFACTURING THREE-DIMENSIONAL SHAPED OBJECT

(71) Applicant: PANASONIC CORPORATION, Osaka (JP)

(72) Inventors: Satoshi Abe, Osaka (JP); Norio Yoshida, Nara (JP); Yoshikazu Higashi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 538 days.

(21) Appl. No.: 14/382,605

(22) PCT Filed: Mar. 6, 2013

(86) PCT No.: PCT/JP2013/001376
§ 371 (c)(1),
(2) Date: Sep. 3, 2014

(87) PCT Pub. No.: WO2013/132840
PCT Pub. Date: Sep. 12, 2013

(65) Prior Publication Data
US 2015/0017055 A1  Jan. 15, 2015

(30) Foreign Application Priority Data
Mar. 9, 2012  (JP) ................................ 2012-052503

(51) Int. Cl.
*B22F 3/00* (2006.01)
*B33Y 30/00* (2015.01)
(Continued)

(52) U.S. Cl.
CPC .............. *B22F 3/008* (2013.01); *B22F 3/105* (2013.01); *B22F 3/1055* (2013.01);
(Continued)

(58) Field of Classification Search
CPC ... B23K 26/0093; B23K 26/16; B22F 3/1055; B22F 2003/1056; B22F 2003/247; B29C 67/0077
(Continued)

(56) References Cited

U.S. PATENT DOCUMENTS 5,132,143 A   7/1992  Deckard
5,316,580 A   5/1994  Deckard
(Continued)

FOREIGN PATENT DOCUMENTS

DE   10112591    10/2001
JP   1-502890    10/1989
(Continued)

OTHER PUBLICATIONS

US 4,937,420, 06/1990, Deckard (withdrawn)
(Continued)

*Primary Examiner* — Jessee Roe
*Assistant Examiner* — Anthony Liang
(74) *Attorney, Agent, or Firm* — Greenblum & Bernstein, P.L.C.

(57) ABSTRACT

A manufacturing method of a three-dimensional shaped object is capable of suitably forming a solidified layer by subsequent formation of a powder layer. The manufacturing method according to an embodiment of the present invention is performed by repetition of a powder-layer forming and a solidified-layer forming, the repetition including forming a solidified layer by irradiating a predetermined portion of a powder layer with a light beam, thereby allowing a sintering of the powder in the predetermined portion or a melting and subsequent solidification thereof; and forming another solidified layer by newly forming a powder layer on the resulting solidified layer, followed by the irradiation of a predetermined portion of the powder layer with the light
(Continued)

beam, wherein a light-beam condition for an irradiation path with an unirradiated portion on both adjacent sides thereof is different from that for another irradiation path with an irradiated portion at an adjacent region.

5 Claims, 15 Drawing Sheets

(51) Int. Cl.
*B22F 3/105* (2006.01)
*B29C 67/00* (2017.01)
*B33Y 10/00* (2015.01)

(52) U.S. Cl.
CPC .......... *B29C 67/0077* (2013.01); *B33Y 10/00* (2014.12); *B33Y 30/00* (2014.12); *B22F 2003/1056* (2013.01); *Y02P 10/295* (2015.11)

(58) Field of Classification Search
USPC ............................................. 419/28; 264/497
See application file for complete search history.

(56) References Cited

U.S. PATENT DOCUMENTS

| | | | |
|---|---|---|---|
| 5,429,908 | A | 7/1995 | Hokuf et al. |
| 5,597,589 | A | 1/1997 | Deckard |
| 5,616,294 | A | 4/1997 | Deckard |
| 5,639,070 | A | 6/1997 | Deckard |
| 5,753,171 | A | 5/1998 | Serbin et al. |
| 7,941,241 | B2 | 5/2011 | Takinami et al. |
| 8,187,521 | B2 | 5/2012 | Larsson et al. |
| 8,550,802 | B2 | 10/2013 | Fuwa et al. |
| 8,738,166 | B2 | 5/2014 | Abe et al. |
| 2002/0041818 | A1* | 4/2002 | Abe ..................... B22F 3/1055 419/7 |
| 2004/0061260 | A1 | 4/2004 | Heugel |
| 2006/0208396 | A1 | 9/2006 | Abe et al. |
| 2008/0099936 | A1 | 5/2008 | Takinami et al. |
| 2009/0121393 | A1 | 5/2009 | Abe |
| 2010/0007062 | A1 | 1/2010 | Larsson et al. |
| 2010/0233012 | A1 | 9/2010 | Higashi et al. |
| 2012/0093674 | A1 | 4/2012 | Abe et al. |
| 2012/0126457 | A1 | 5/2012 | Abe et al. |
| 2012/0211926 | A1 | 8/2012 | Larsson et al. |
| 2012/0251378 | A1 | 10/2012 | Abe et al. |
| 2012/0308781 | A1 | 12/2012 | Abe et al. |
| 2013/0069282 | A1 | 3/2013 | Abe et al. |
| 2013/0075575 | A1 | 3/2013 | Abe et al. |
| 2013/0300035 | A1 | 11/2013 | Snis |
| 2014/0010908 | A1 | 1/2014 | Matsumoto et al. |
| 2014/0147328 | A1 | 5/2014 | Abe et al. |

FOREIGN PATENT DOCUMENTS

| | | |
|---|---|---|
| JP | H06-297585 A | 10/1994 |
| JP | 10-505799 | 6/1998 |
| JP | 2000-073108 | 3/2000 |
| JP | 2003-321704 | 11/2003 |
| JP | 2004-130793 | 4/2004 |
| JP | 2004-277881 | 10/2004 |
| JP | 2008-111151 | 5/2008 |
| JP | 2009-544501 | 12/2009 |
| JP | 2014-508668 | 4/2014 |
| WO | 88/02677 | 4/1988 |
| WO | 2007/058160 | 5/2007 |
| WO | 2012/160811 | 11/2012 |

OTHER PUBLICATIONS

Germany Office action, dated Mar. 3, 2015 along with an English translation thereof.
Search report from PCT/JP2013/001376, mail date is Jun. 18, 2013, with an English translation thereof.
Japan Office action, mail date is Apr. 22, 2014.
Office Action issued in Korean Family member Patent Appl. No. 10-2014-7022703, date is Jan. 22, 2016.

* cited by examiner

Fig. 10
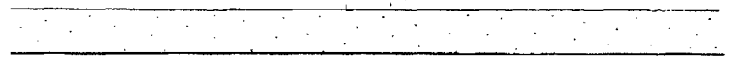
Light beam (with irradiation energy "$E_1$")
for initial irradiation path
$E_1 < E_2$
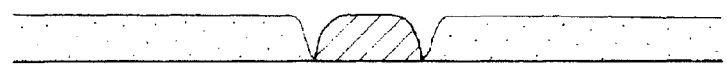
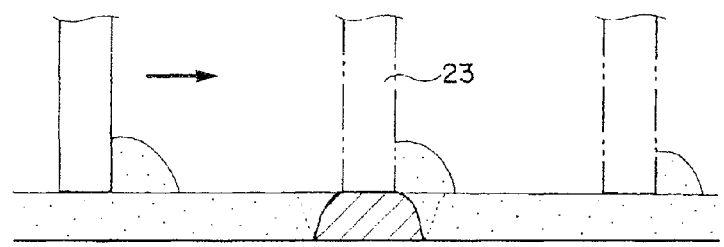
23
Light beam (with irradiation energy "$E_2$")
for second irradiation path
(or each of subsequent irradiation paths)
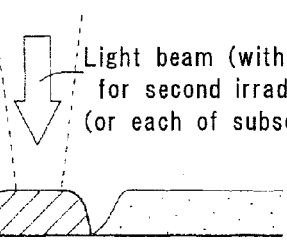

Fig. 13
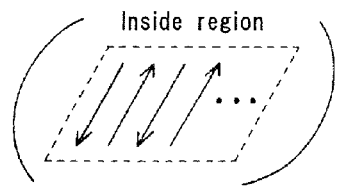
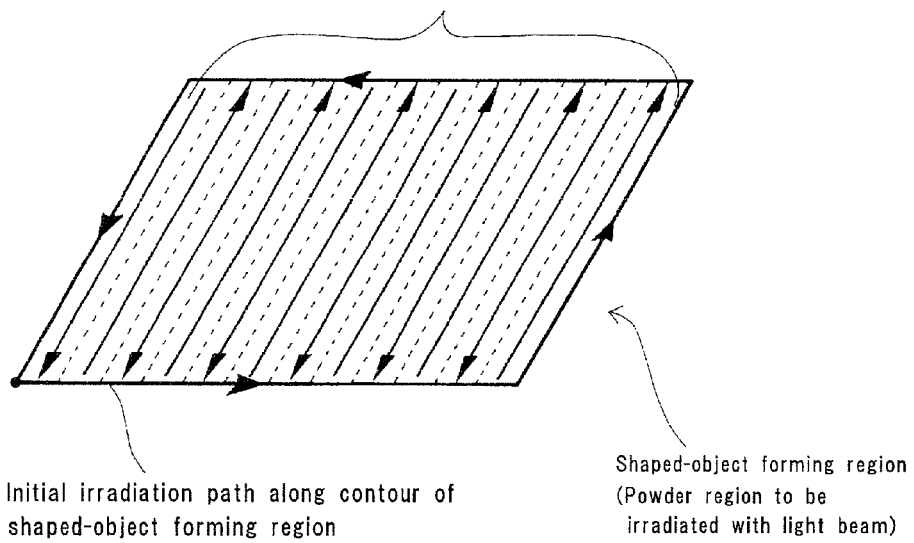
Subsequent irradiation paths located inside of contour of shaped
-object forming region, each of the subsequent paths being
adjacent to prior irradiation path thereto
Initial irradiation path along contour of
shaped-object forming region
Shaped-object forming region
(Powder region to be
irradiated with light beam)
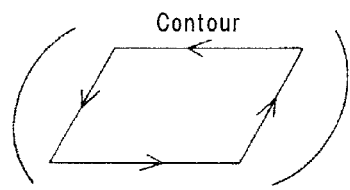

Fig. 14
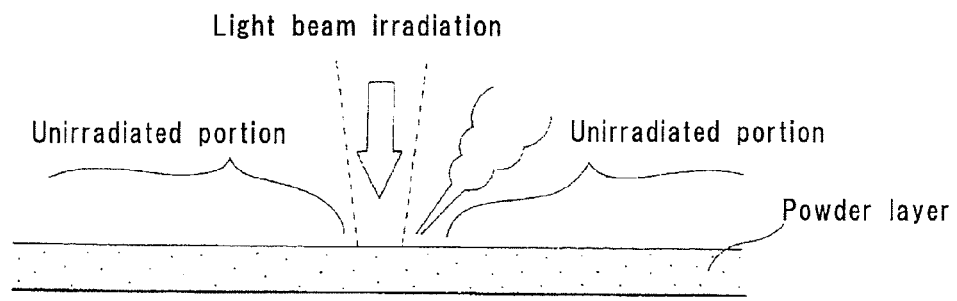
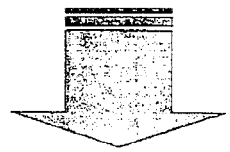
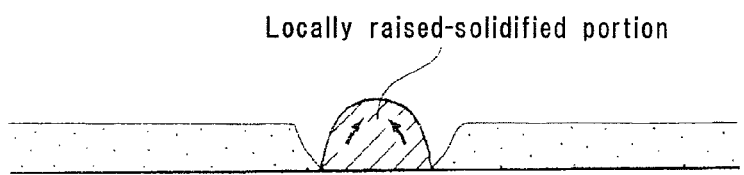

METHOD FOR MANUFACTURING THREE-DIMENSIONAL SHAPED OBJECT

TECHNICAL FIELD

The present disclosure relates to a method for manufacturing a three-dimensional shaped object. More particularly, the present disclosure relates to a method for manufacturing a three-dimensional shaped object with a plurality of solidified layers stacked integrally by repeating the step of forming the solidified layer by irradiating a predetermined portion of a powder layer with a light beam.

BACKGROUND OF THE INVENTION

Heretofore, a method for manufacturing a three-dimensional shaped object by irradiating a powder with a light beam has been known (such method can be generally referred to as "selective laser sintering method"). Such method can produce the three-dimensional shaped object with a plurality of solidified layers stacked integrally by repeating the step (i) of forming the solidified layer by irradiating a predetermined portion of a powder layer with a light beam, thereby allowing sintering of the predetermined portion of the powder or melting and subsequent solidification thereof, and the step (ii) of forming another solidified layer by newly forming a powder layer on the resulting solidified layer, followed by similarly irradiating the powder layer with the light beam (see JP-T-01-502890 or JP-A-2000-73108). The three-dimensional shaped object thus obtained can be used as a metal mold in a case where inorganic powder materials such as a metal powder and a ceramic powder are used as the powder material. While on the other hand, the three-dimensional shaped object can be used as a model or replica in a case where organic powder materials such as a resin powder and a plastic powder are used as the powder material. This kind of technology makes it possible to produce the three-dimensional shaped object with a complicated contour shape in a short period of time.

By way of the case wherein the metal powder is used as the powder material, and the three-dimensional shaped object is used as the metal mold, the selective laser sintering method will be described. As shown in FIGS. 1A and 1B, a powder layer 22 with a predetermined thickness "t1" is firstly formed on a base plate 21 (see FIG. 1A) and then a predetermined portion of the powder layer 22 is irradiated with a light beam to form a solidified layer 24 Then, another powder layer 22 is newly provided on the solidified layer 24 thus formed and is irradiated again with the light beam to form another solidified layer. In this way, the solidified layers are repeatedly formed, making it possible to produce a three-dimensional shaped object with a plurality of the solidified layers 24 stacked integrally (see FIG. 1B). The lowermost solidified layer can be formed in a state of being adhered to the surface of the base plate. Therefore, the three-dimensional shaped object and the base plate are mutually integrated. The integrated "three-dimensional shaped object" and "base plate" can be used as the metal mold as they are.

PATENT DOCUMENTS

Related Art Patent Documents

PATENT DOCUMENT 1: Japanese Unexamined Patent Application Publication No. H01-502890

PATENT DOCUMENT 2: Japanese Unexamined Patent Application Publication No. 2000-73108

DISCLOSURE OF THE INVENTION

Problems to be Solved by the Invention

With respect to the selective laser sintering method, the inventors of the present application have found that, when a powder region with an unirradiated portion on both adjacent sides thereof is irradiated with the light beam, such powder region can bulge to a comparatively large degree, resulting in a locally raised portion of the solidified layer (see FIG. 14). While not intending to be bound by any specific theory, one of the presumed reasons of the occurring of the locally raised portion is that the irradiated portion with the light beam melts accompanying the inclusion of the powder on both adjacent sides of the irradiated portion into the melted portion, which causes a local agglomeration of the melted portion due to a surface tension thereof.

In other words, the inventors of the present application have found that the repeated formations of the solidified layers by sequential scannings of the light beam with the same light-beam condition can cause a generation of the locally raised portion where a part of the solidified layer has bulged to a comparatively large degree (such locally raised portion being referred to also as "raised-solidified portion"). The raised-solidified portion can bring a disadvantageous effect. For example, a squeegee blade can collide with the raised-solidified portion upon the subsequent supply of the powder, making it impossible to form the desired powder layer. Even if the powder layer is formed, there can be variation in thickness of the powder layer due to the presence of the raised-solidified portion.

Under these circumstances, an embodiment of the present invention has been created. That is, an object of an embodiment of the present invention is to provide a manufacturing method of the three-dimensional shaped object, the method being capable of suitably forming the solidified layer in view of the subsequent formation of the powder layer.

Means for Solving the Problems

In order to achieve the above object, one embodiment of the present invention provides a method for manufacturing a three-dimensional shaped object, the method including the steps of:

(i) forming a solidified layer by irradiating a predetermined portion of a powder layer with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam, the step (ii) being repeatedly performed, wherein light-beam condition for "irradiation path with an unirradiated portion on both adjacent sides thereof" is different from that for "another irradiation path with an irradiated portion at an adjacent region thereto".

For example, a light-beam irradiation energy for "irradiation path with the unirradiated portion on the both adjacent sides thereof" may be lower than that for "another irradiation path with the irradiated portion at the adjacent region thereto". A light-beam irradiation power for "irradiation path with the unirradiated portion on the both adjacent sides thereof" may also be lower than that for "another irradiation path with the irradiated portion at the adjacent region thereto".

In a preferred embodiment, the light-beam condition for at least an initial irradiation path for each of the powder layers is different from that for the other irradiation paths for the each of the powder layers.

In another preferred embodiment, an each irradiation path for each of the powder layers is divided into a sub-irradiation path "A" with the unirradiated portion on the both adjacent sides thereof and a sub-irradiation path "B" with the irradiated portion at the adjacent region thereto, and the light-beam condition for the sub-irradiation path "A" is different from that for the sub-irradiation path "B".

In still preferred embodiment, an initial path is "path along a contour of a shaped-object forming region", whereas subsequent paths are "paths located inside of the contour, each of the subsequent paths being adjacent to a prior path thereto", in which case a light-beam irradiation energy for the initial path is lower than that for each of the subsequent paths, and alternatively a light-beam irradiation power for the initial path is lower than that for each of the subsequent paths.

Effect of the Invention

The different light-beam condition between "irradiation path with the unirradiated portion on both adjacent sides thereof" and "another irradiation path with the irradiated portion at an adjacent region thereto" makes it possible to reduce the occurring of "locally raised portion". This means that the related-art disadvantage attributed to "locally raised portion" can be avoided in accordance with the manufacturing method according to an embodiment of the present invention. For example, the manufacturing method according to an embodiment of the present invention can avoid such a disadvantage that the squeegee blade collides with the raised-solidified portion upon the subsequent supply of the powder, the collision of the squeegee blade making it impossible to form the desired powder layer. The manufacturing method according to an embodiment of the present invention can also avoid such a disadvantage that the variation in thickness of the powder layer is caused, the variation being attributed to the presence of the raised-solidified portion.

In other words, even in the case of the repeated formations of the solidified layers by sequential scannings of the light, approximately the uniform thickness can be obtained for each of the locally raised portions generated by such sequential scannings. This results in a more uniform solidified layer as a whole (see FIG. 8). The more uniform solidified layer makes it possible to suitably perform a subsequent formation of the powder layer by the sliding movement of the squeegee blade, which leads to an approximately uniform thickness of the powder layer. The approximately uniform thickness of the powder layer can promote an ensuring of a uniformity of the solidified density of the solidified layer resulted from such powder layer.

As such, the formation of the solidified layer according to an embodiment of the present invention makes it possible to suitably perform the subsequent formation of the powder layer, which finally leads to an effective production of the three-dimensional shaped object with a desired quality.

BRIEF DESCRIPTION OF THE DRAWINGS

FIGS. 7A and 7B are schematic views showing a general concept according to an embodiment of the present invention wherein FIG. 7A illustrates a light-beam irradiation for "irradiation path with an unirradiated portion on both adjacent sides thereof", and FIG. 7B illustrates a light-beam irradiation for "irradiation path with an irradiated portion at an adjacent region thereto".

FIG. 10 is a schematic view showing an embodiment in which an irradiation energy $E_1$ for an initial irradiation path is lowered than an irradiation energy $E_{2, 3, 4, \ldots}$ for each of subsequent irradiation paths.

FIG. 13 is an illustration for explaining an embodiment of scannings wherein an initial path is a path along a contour of a shaped-object forming region, whereas subsequent paths are located inside of the contour, each of the subsequent paths being adjacent to a prior path thereto.

FIG. 14 is an illustration for explaining an embodiment wherein, when a powder region with an unirradiated portion on both adjacent sides thereof is irradiated with the light beam, a bulge of such powder region occurs to a comparatively large degree, resulting in a locally raised portion (Related Art).

MODES FOR CARRYING OUT THE INVENTION

Figure 1A:
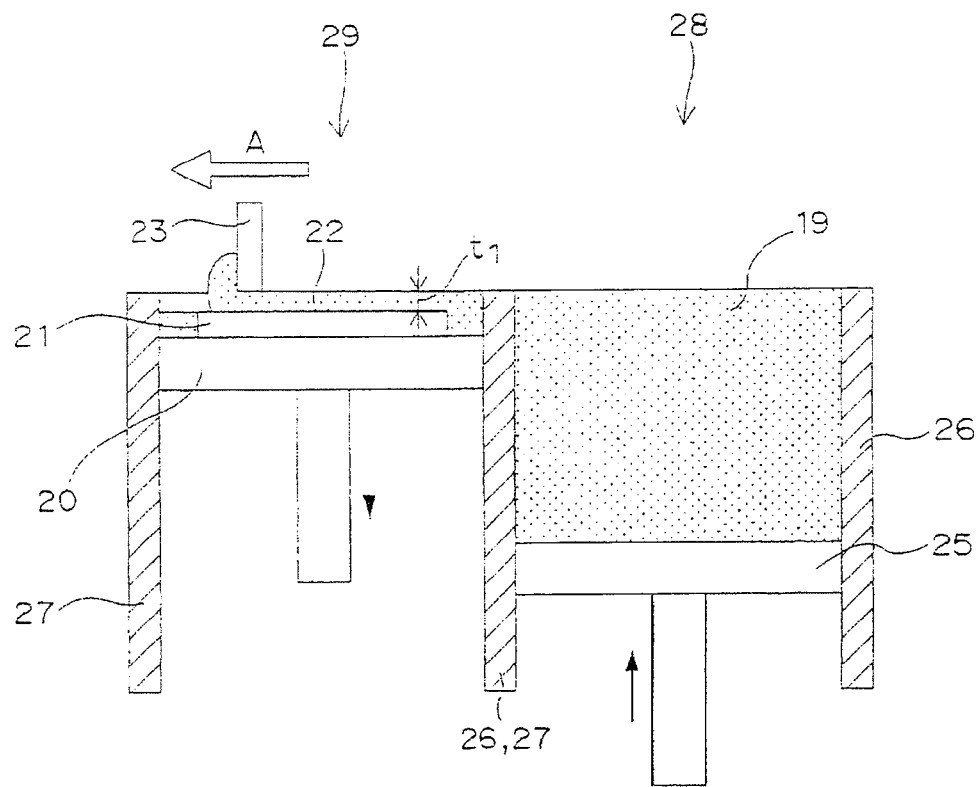
FIGS. 1A and 1B are sectional views schematically showing operations of a laser-sintering/machining hybrid machine.

An embodiment of the present invention will be described in more detail with reference to the accompanying drawings. It should be noted that dimensional proportions in the drawings are merely for illustrative purposes, and thus not the same as those of the actual parts or elements.

The term "powder layer" as used in this description and claims means, for example, "metal powder layer made of a metal powder" or "resin powder layer made of a resin powder". Also, the term "predetermined portion of a powder layer" substantially means a portion of a three-dimensional shaped object to be manufactured. Therefore, a powder existing in such predetermined portion is irradiated with a light beam, whereby, the powder undergoes a sintering or a melting and subsequent solidification thereof to form a shape of a three-dimensional shaped object. Furthermore, the term "solidified layer" substantially means "sintered layer" when the powder layer is a metal powder layer, whereas term "solidified layer" substantially means "cured layer" when the powder layer is a resin powder layer.

[Selective Laser Sintering Method]

Figure 1B:
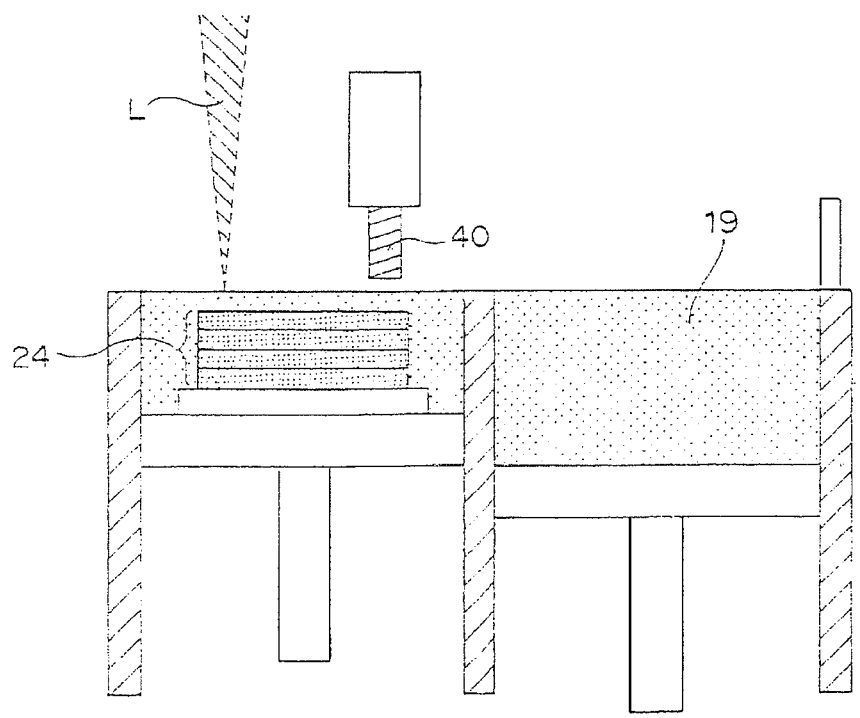
Figure 2A:
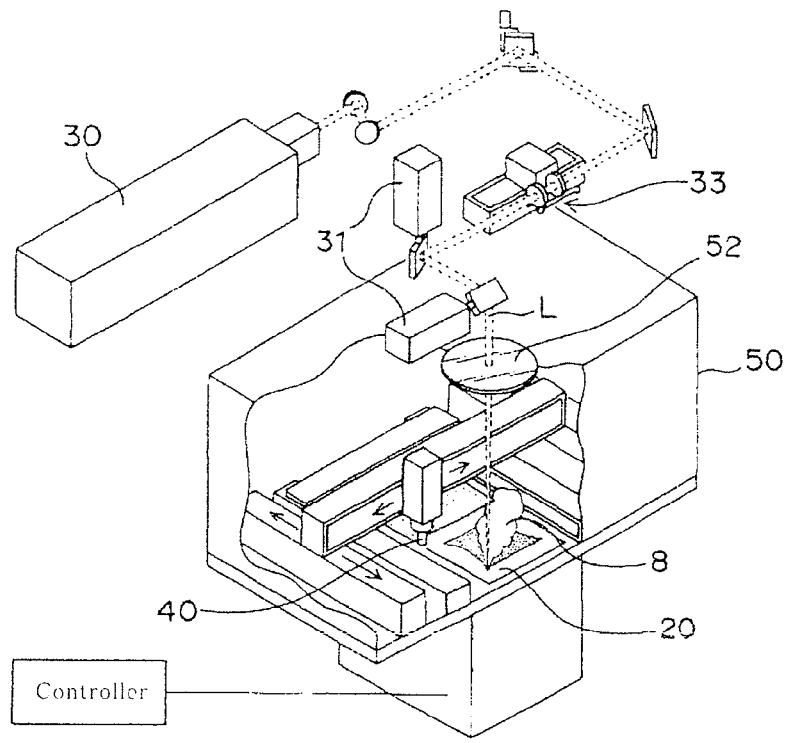
FIGS. 2A and 2B are perspective views schematically illustrating a device for performing a laser sintering (i.e., selective laser sintering method) wherein FIG. 2A especially shows a hybrid device with a machining mechanism, and FIG. 2B especially shows a device with no machining mechanism.
Figure 2B:
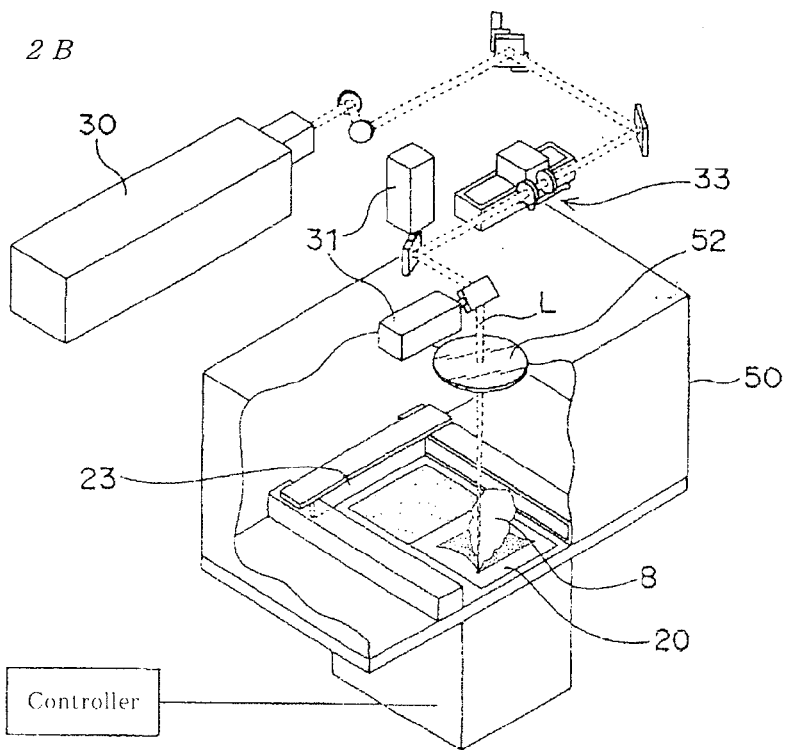
Figure 3:
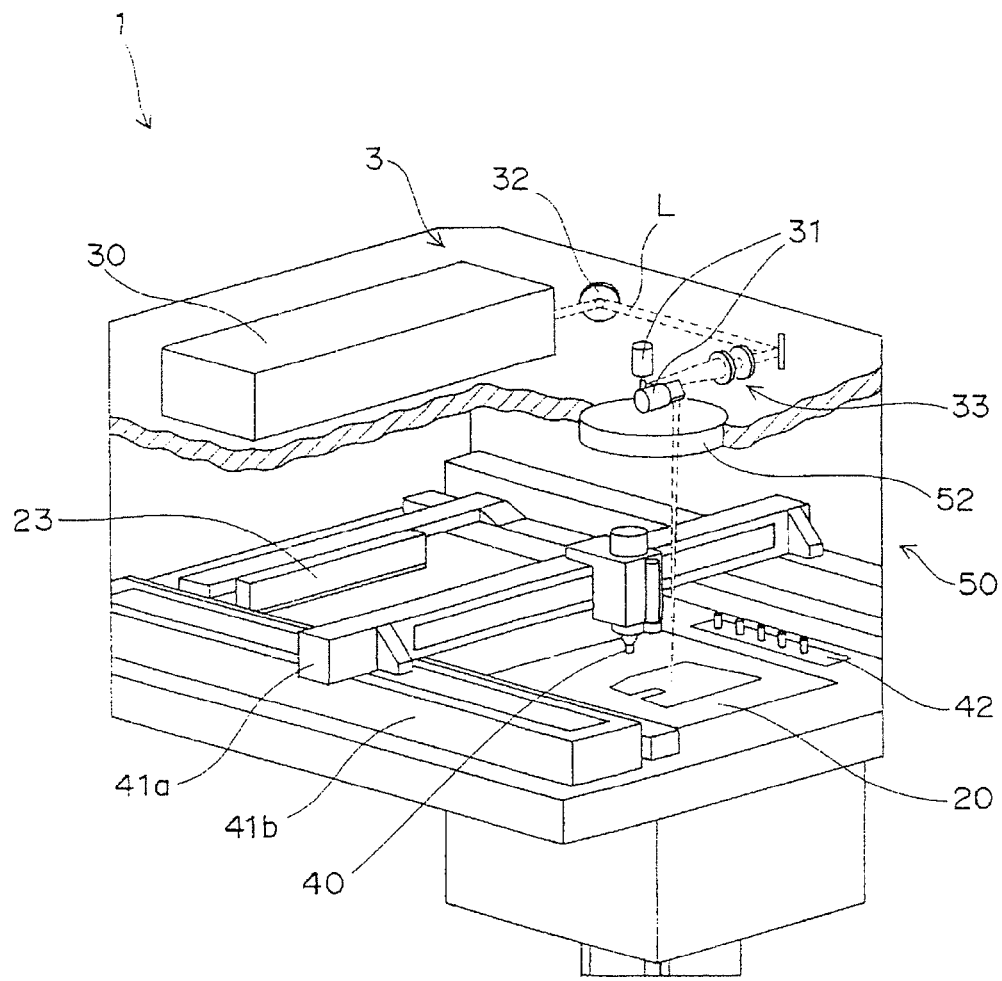
FIG. 3 is a perspective view schematically showing an embodiment in which a selective laser sintering method is carried out.
Figure 4:
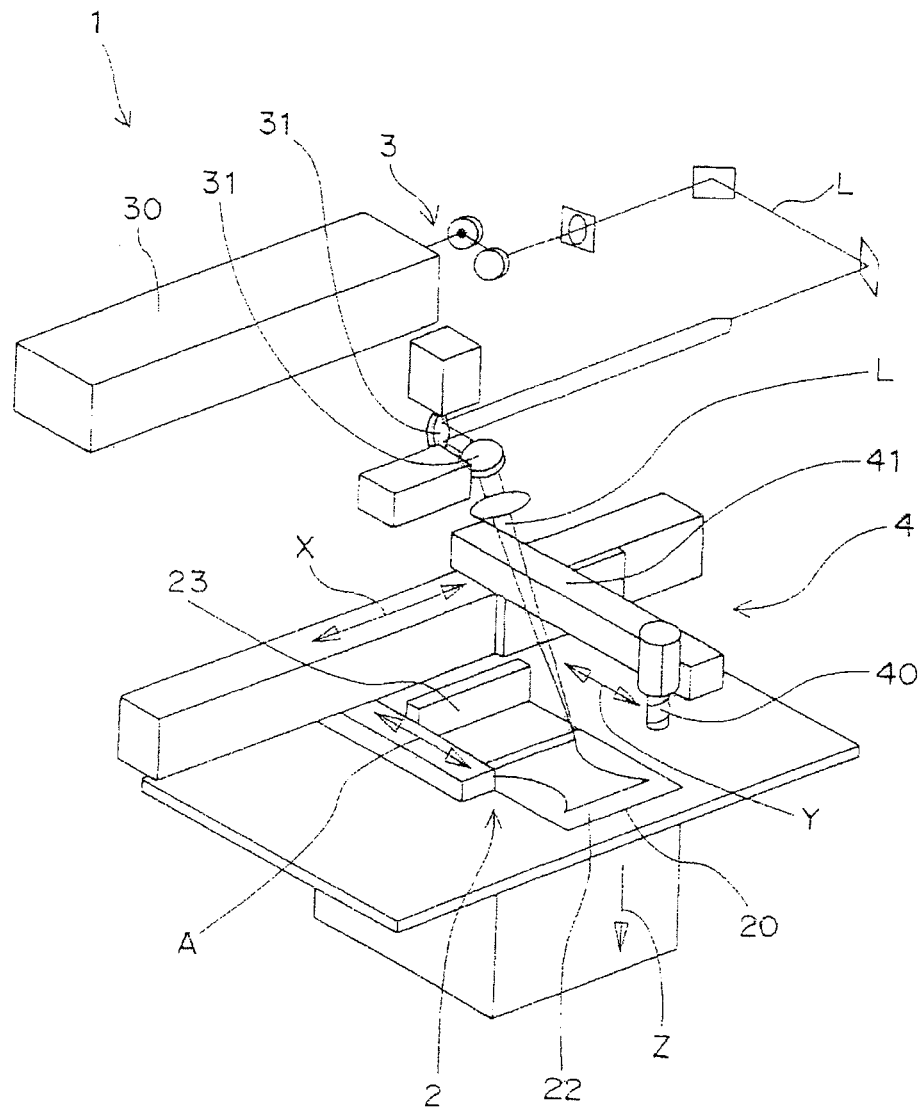
FIG. 4 is a perspective view schematically showing a constitution of a laser-sintering/machining hybrid machine by which a selective laser sintering method is carried out.

First, a selective laser sintering method, on which an embodiment of the manufacturing method of the present invention is based, will be described. For convenience, the selective laser sintering method, which will be described, is one where powder material is supplied from a storage tank therefor, followed by being flattened by means of a squeegee blade to form a powder layer therefrom. Moreover, by way of example, the selective laser sintering method wherein a machining process is additionally carried out with respect to the shaped object (i.e., the method embodiment as shown in FIG. 2A, not FIG. 2B) will be described. FIGS. 1A, 1B, 3 and 4 show functions and constitutions, which enable an execution of the selective laser sintering method, with respect to a metal laser sintering hybrid milling machine. The laser-sintering/milling hybrid machine 1 is mainly provided with a "powder layer forming means 2 for forming a powder layer by providing a powder such as a metal powder or a resin powder in a predetermined thickness"; a "forming table 20 which is capable of vertically elevating/descending by cylinder drive in a forming tank 29 whose outer periphery is surrounded with a wall 27"; a "base plate 21 for shaped object, which is disposed on the forming table 20 and serves as a platform of the shaped object"; a "light-beam irradiation means 3 for irradiating a desired position with an emitted light beam L"; and a "machining means 4 for milling the periphery of a shaped object". As shown in FIGS. 1A and 1B, the powder layer forming means 2 is mainly composed of a "powder table 25 capable of vertically elevating/descending by cylinder drive in a storage tank for powder material 28 whose outer periphery is surrounded with a wall 26" and a "squeegee blade 23 for forming a powder layer 22 on the base plate for shaped object or forming table". As shown in FIGS. 3 and 4, the light-beam irradiation means 3 is mainly composed of a "light beam generator 30 for emitting a light beam L" and a "galvanometer mirror 31 (i.e., scan optical system) for scanning a light beam L onto a powder layer 22". Optionally, the light-beam irradiation means 3 is equipped with a beam shape correcting means for correcting a shape of a light beam spot (e.g., a means composed of a pair of cylindrical lens and a rotation drive mechanism for rotating the lens around a shaft line of the light beam) and fθ lens. The machining means 4 is mainly composed of a "milling head 40 for milling the periphery of a shaped object" and an "X-Y actuator 41 (41a, 41b) for driving the milling head 40 to move toward the position to be milled" (see FIGS. 3 and 4).

Figure 5:
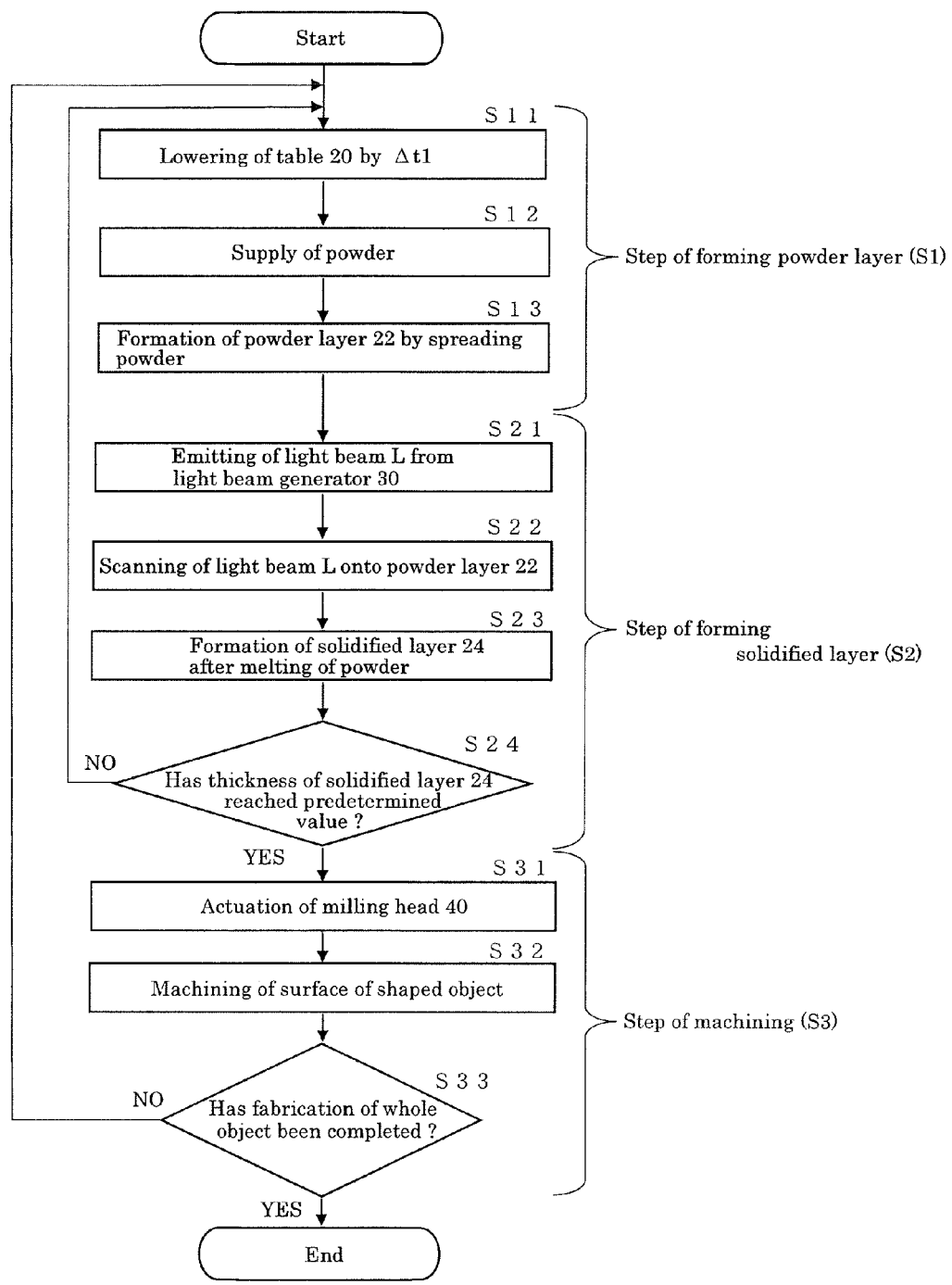
FIG. 5 is a flow chart of operations of a laser-sintering/machining hybrid machine.
Figure 6:
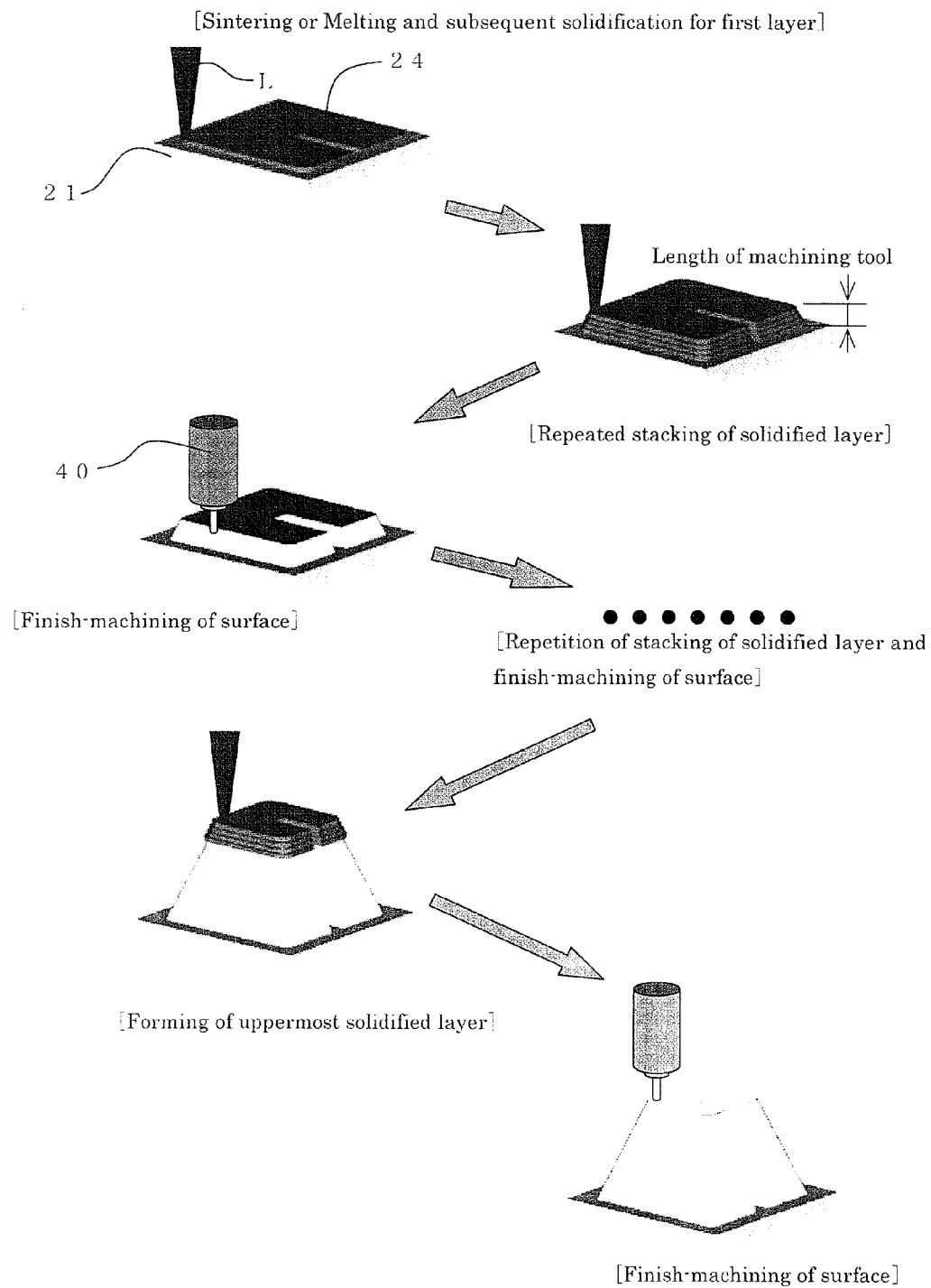
FIG. 6 is a schematic view showing a laser-sintering/machining hybrid process over time.

Operations of the metal laser sintering hybrid milling machine 1 will be described in detail with reference to FIGS. 1A, 1B, 5 and 6. FIG. 5 shows a general operation flow of a metal laser sintering hybrid milling machine. FIG. 6 schematically and simply shows a laser-sintering/machining hybrid process.

The operations of the metal laser sintering hybrid milling machine are mainly composed of a powder layer forming step (S1) of forming a powder layer 22; a solidified layer forming step (S2) of irradiating the powder layer 22 with a light beam L to form a solidified layer 24; and a machining step (S3) of milling a surface of a shaped object. In the powder layer forming step (S1), first, the forming table 20 is descended by Δt1 (S11). Subsequently, a powder table 25 is elevated by Δt1, and thereafter the squeegee blade 23 is driven to move in the direction of arrow "A" as shown in FIG. 1A. This enables a powder (e.g., an "iron powder having a mean particle diameter of about 5 μm to 100 μm" or a "powder having a mean particle diameter of about 30 μm to 100 μm, such as a powder of nylon, polypropylene or ABS") placed on the powder table 25 to be spread to form a powder layer 22 in a predetermined thickness Δt1 (S13), while being transferred onto the base plate 21 (S12). Following this step, the solidified layer forming step (S2) is performed. In the solidified layer forming step, a light beam L (e.g., carbon dioxide gas laser (about 500 W), Nd:YAG laser (about 500 W), fiber laser (about 500 W) or ultraviolet light) is emitted from the light beam generator 30 (S21) and then a light beam L is scanned onto a desired position of the powder layer 22 by means of the galvanometer mirror 31 (S22). The scanned light beam can cause the powder to be melted and then solidified, resulting in a formation of the solidified layer 24 integrated with the base plate 21 (S23). There is not limitation on transmission of the light beam in air, and the light beam may also be transmitted through an optical fiber or the like.

The powder layer forming step (S1) and the solidified layer forming step (S2) are repeatedly performed until the thickness of the stacked layers 24 reaches such a predetermined value that is determined based on a tool length of the milling head 40 (see FIG. 1B). Upon a sintering of the powder or a melting and subsequent solidification of the powder, the newly stacked solidified layer is integrated with the solidified layer which has already been formed and located therebeneath.

When the thickness of the stacked solidified layers 24 reaches a predetermined thickness, the machining step (S3) is initiated. In the embodiments as shown in FIG. 1B and FIG. 6, the milling head 40 is actuated to initiate execution of the machining step (S31). For example, in a case where the tool (ball end mill) of the milling head 40 has a diameter of 1 mm and an effective milling length of 3 mm, a milling with a milling depth of 3 mm can be performed. Therefore, when is 0.05 mm, the milling head 40 is actuated when sixty solidified layers are formed. The milling head 40 is moved in X and Y directions by means of the X-Y actuator 41 (41a, 41b) and the shaped object composed of stacked solidified layers 24 is subjected to the surface machining (S32). When the entire three-dimensional shaped object has not yet been manufactured, the step returns to the powder layer forming step (S1). Thereafter, the steps S1 through S3 are repeatedly performed to further stack the solidified layers 24, which leads to a manufacturing of the desired three-dimensional shaped object (see FIG. 6).

An irradiation path of the light beam L in the solidified layer forming step (S2) and a milling path in the machining step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch when Δt1 is 0.05 mm) sliced sections of STL data produced from a 3-D CAD model, are used.

[Manufacturing Method of the Present Invention]

Figure 7A:
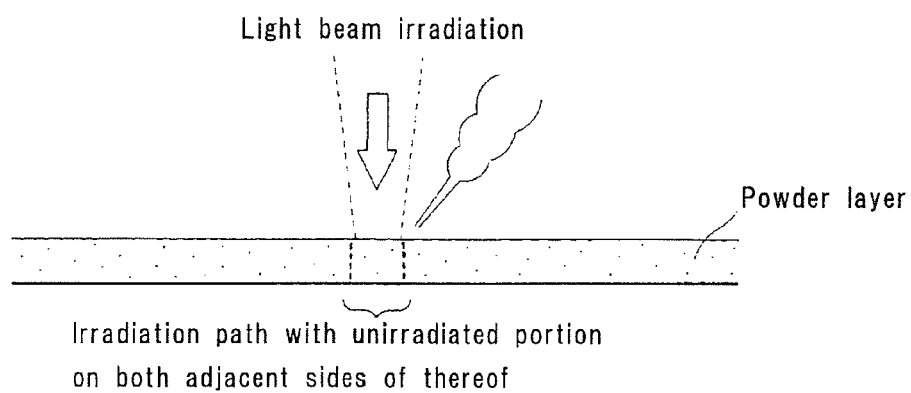
Figure 7B:
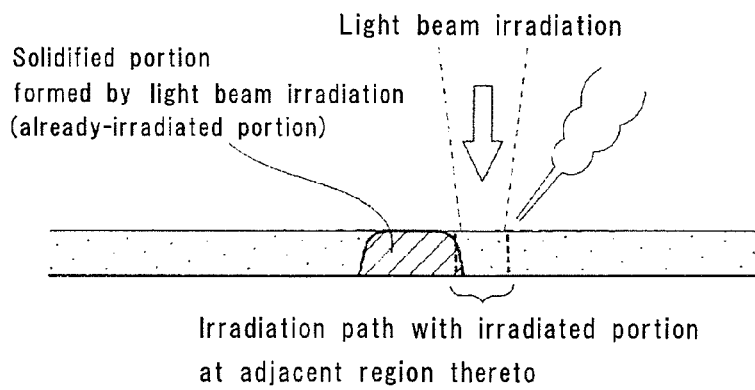

An embodiment of the present invention is characterized by the solidified layer forming step performed during the above described selective laser sintering method. It is particularly characterized by an irradiation condition of the light beam. Specifically, the manufacturing method according to an embodiment of the present invention performs the solidified-layer forming such that a light-beam condition for an irradiation path with an unirradiated portion on both adjacent sides thereof (FIG. 7A) is different from that for another irradiation path with an irradiated portion at an adjacent region thereto (FIG. 7B).

The phrase "irradiation path with an unirradiated portion on both adjacent sides thereof" as used herein means a scan path of the light beam, having a powder region on both adjacent sides of the scan path, the powder region being no light-beam irradiated region. In other words, the phrase "irradiation path with an unirradiated portion on both adjacent sides thereof" means such a scan path that has a powder state at the two adjacent sides of the scan path (i.e., at right-and-left adjacent regions of the scan path). See FIG. 7A with respect to "irradiation path with an unirradiated portion on both adjacent sides thereof". While on the other hand, the phrase "another irradiation path with an irradiated portion at an adjacent region thereto" as used herein means a scan path of the light beam, having a solidified portion on at least one adjacent side of the scan path, the solidified portion being an irradiated portion which has been already irradiated with the light beam. In other words, the phrase "another irradiation path with an irradiated portion at an adjacent region thereto" means such a scan path that has the solidified portion which has been formed by the light-beam irradiation at the one adjacent side or the two adjacent sides of the scan path. See FIG. 7B with respect to "another irradiation path with an irradiated portion at an adjacent region thereto".

As such, a discrimination is made whether the scan path of the light beam corresponds to "irradiation path with an unirradiated portion on both adjacent sides thereof" or "irradiation path with an irradiated portion at an adjacent region thereto". They are treated as differentiated scan paths from each other, according to an embodiment of the present invention.

Figure 8:
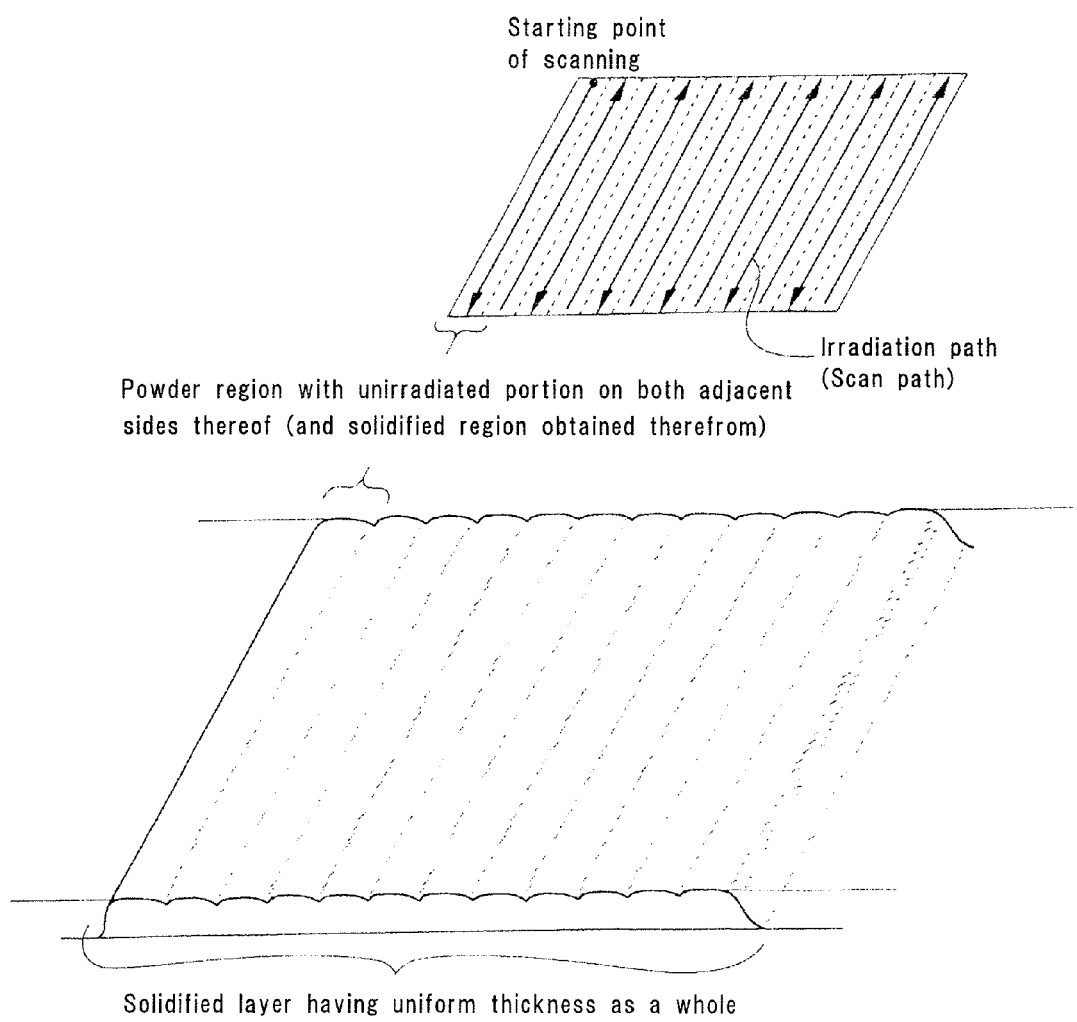
FIG. 8 is a schematic view for explaining "approximately the uniform thickness of the solidified layer as a whole" formed according to an embodiment of the present invention.
Figure 15:
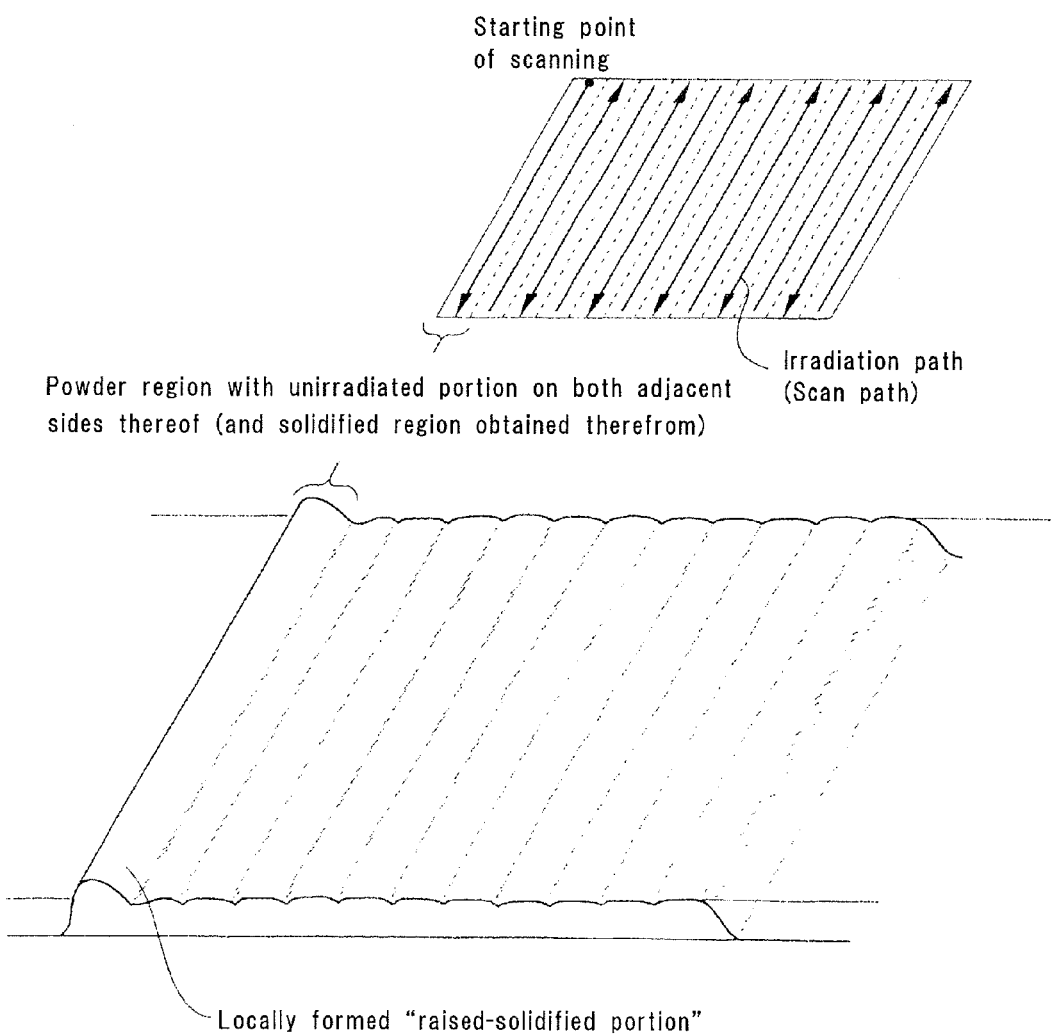
FIG. 15 is an illustration for explaining an embodiment wherein a solidified-layer forming by sequential scannings of the light beam with the same light-beam condition can cause a local generation of "raised-solidified portion" (Related Art).

More specifically, it is preferred in an embodiment of the present invention that a light-beam irradiation energy for the irradiation path "L" with the unirradiated portion on the both adjacent sides thereof is lower than that for the irradiation path "L'" with the irradiated portion at the adjacent region thereto. This makes it possible to suppress the occurring of "locally raised portion", such occurring being illustrated in FIGS. 14 and 15. The suppressing of the occurring of "locally raised portion" enables the resulting solidified layer to have approximately the uniform thickness as a whole as shown in FIG. 8.

The irradiation energy "E" can be defined by the following Equation 1.

$$E = P/(v \cdot \phi) \quad \text{[Equation 1]}$$

E (J/mm$^2$): Irradiation energy (Irradiation energy density)
P (W): Irradiation power (Laser output)
v (mm/s): scanning rate
φ (mm): Condensing diameter of light beam According to the preferred embodiment of the present invention, the irradiation energy "E" for the irradiation path "L" is lower than the irradiation energy "E'" for the irradiation path "L'". By way of example only, the irradiation energy "E" (J/mm$^2$) for the irradiation path "L" may be lower than the irradiation energy "E'" (J/mm$^2$) for the irradiation path "L'" preferably by about 10% to about 50%, more preferably by about 20% to about 40%.

Figure 9:
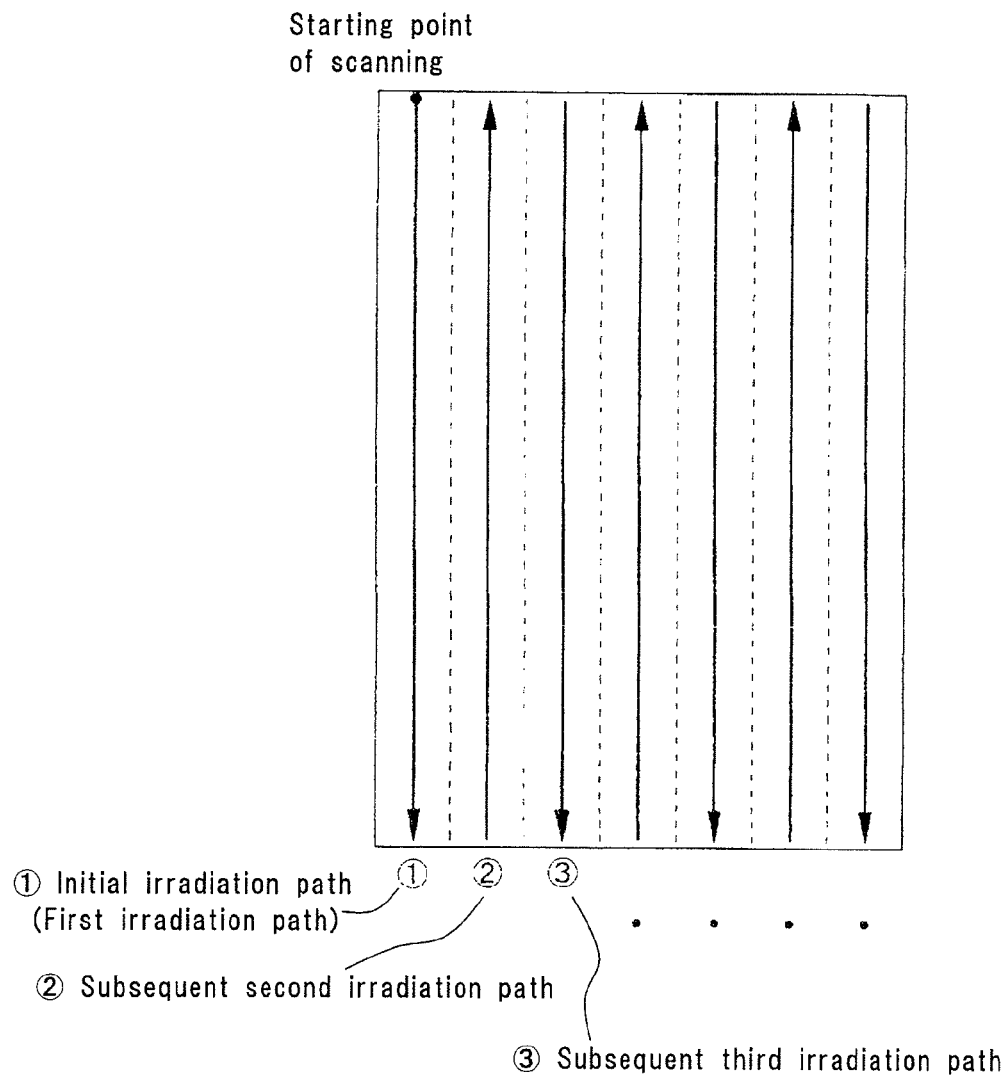
FIG. 9 is a schematic view showing an embodiment in which scannings of the light beam are sequentially performed for a formation of solidified layer such that a plurality of the irradiation paths are adjacent to each other.

Under any circumstances, an initial irradiation path for each of the powder layers can correspond to "irradiation path with an unirradiated portion on both adjacent sides thereof". It is thus preferred that the light-beam condition for the initial irradiation path for each of the powder layers is different from that for the other irradiation paths for such each of the powder layers. For example, in a case where the solidified-layer forming is performed by the repetition of the sequential scannings such that a plurality of the irradiation paths are adjacent to each other (see FIG. 9), it is preferred that the light-beam condition for the initial irradiation path is different from that for each of the other subsequent irradiation paths. The above case can correspond to a case where a solidified portion formed by a scan path is integrated with another adjacent solidified portion formed by the immediately prior scan path, leading to a formation of the solidified layer. More specifically, it is preferred that the irradiation energy "$E_2$" for the initial irradiation path is different from each of the irradiation energies "$E_{2, 3, 4, \ldots}$" for the other subsequent irradiation paths (see FIG. 10).

The different light-beam condition according to an embodiment of the present invention can be performed by, in addition to (a) adjusting the irradiation energy, (b) adjusting a scanning rate of the light beam, and (c) adjusting a condensing diameter of the light beam. For example, with respect to the irradiation path "L" with the unirradiated portion on the both adjacent sides thereof, (a) the irradiation energy of the light beam is lowered, (b) the scanning rate of the light beam is higher, or (c) the condensing diameter of the light beam is increased, compared to the another irradiation path "L'" with the irradiated portion at the adjacent region thereto. This makes it possible to form the solidified layer having approximately the uniform thickness as a whole, as shown in FIG. 8. The aforementioned operations (a) to (d) may be performed alone, or in their combination.

Figure 11:
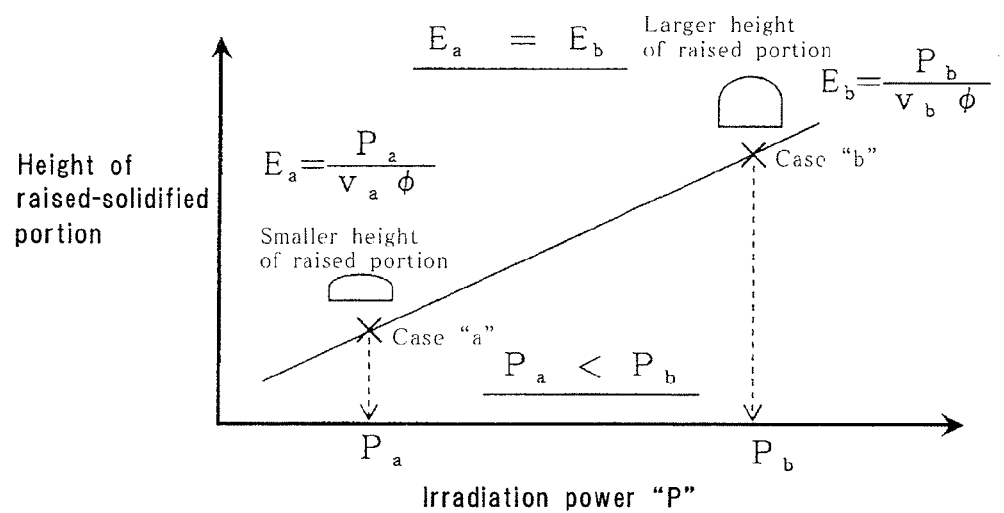
FIG. 11 a graph for explaining that "raised-solidified portion" can be suppressed by lowering an irradiation power "P" while keeping an irradiation energy "E" the same.

As for the different light-beam condition, the irradiation power "P" (i.e., "P" in the above Equation 1) may be adjusted. In this regard, the inventors of the present application have found that "raised-solidified portion" can be suppressed by adjusting the irradiation power "P" even when the irradiation energy "E" is kept the same (see FIG. 11). As seen from the graph of FIG. 11, the suppressing effect of the "raised-solidified portion" regarding a case "A" is larger than that of a case "B" in spite of the same irradiation energy "E", the irradiation power "P" of the case "A" being lower than that of the case "B". Just as an example, under the same condition of the irradiation energy "E", the irradiation power "P" (W) for the irradiation path "L" may be lowered than the irradiation power "P'" (W) for the irradiation path "L'" by about 30% to about 80%, preferably by about 50% to about 75%.

As such, it is preferred in an embodiment of the present invention that the irradiation power "P" for the irradiation path "L" with the unirradiated portion on the both adjacent sides thereof is lower than the irradiation power "P'" for the irradiation path "L'" with the irradiated portion at the adjacent region thereto. Similarly, it is preferred that the irradiation power "$P_1$" for at least an initial irradiation path for each of the powder layers is different from the irradiation powers "$P_{2, 3, 4, \ldots}$" for the other irradiation paths for the each of the powder layers. By way of example only, the irradiation power "$P_1$" may be lower than each of the irradiation powers "$P_{2, 3, 4, \ldots}$" under such a condition that the irradiation energy for the former is same as that for the latter. With respect to the discrimination between "irradiation path with an unirradiated portion on both adjacent sides thereof" and "irradiation path with an irradiated portion at an adjacent region thereto", various embodiments can be possible.

Figure 12:
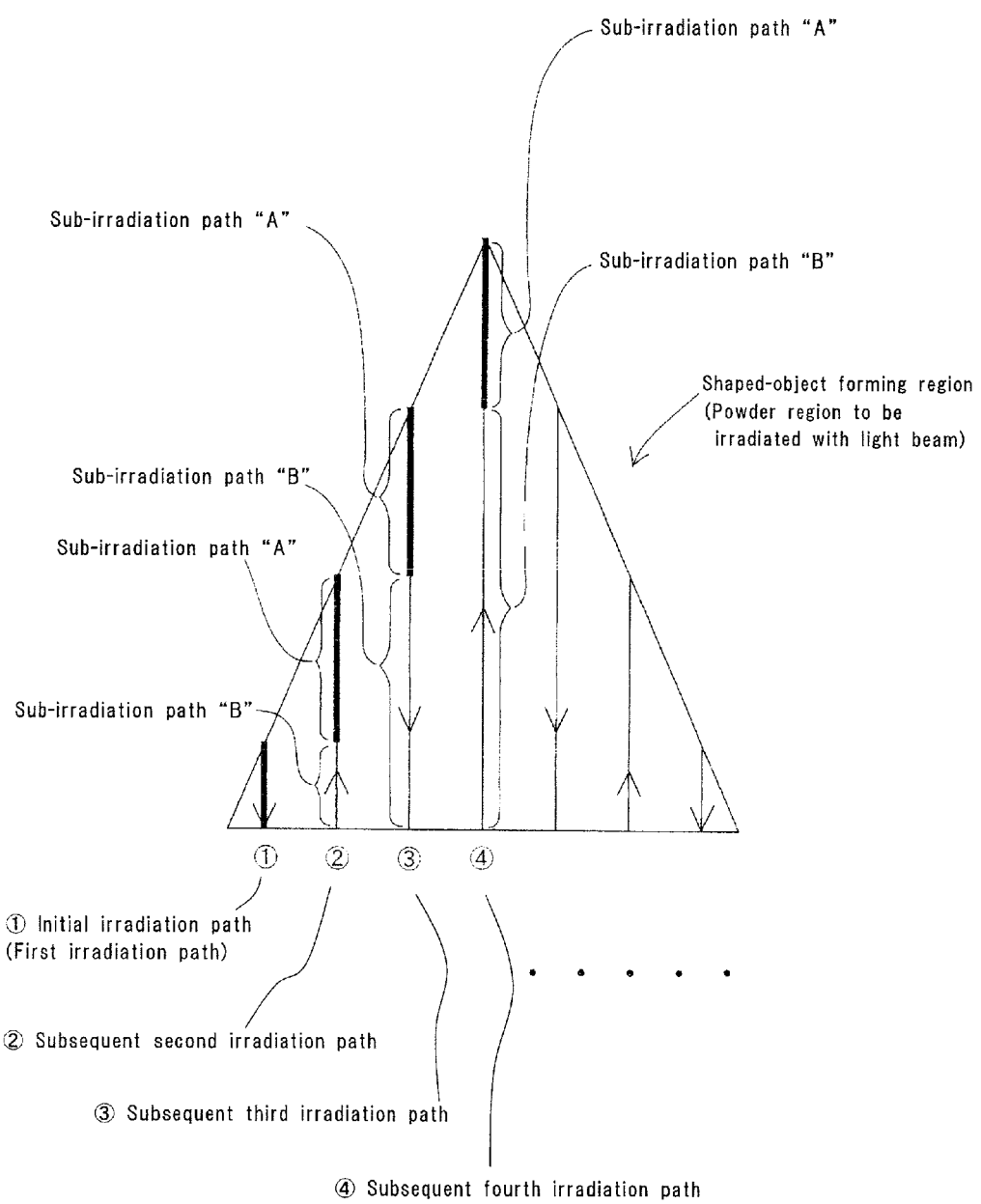
FIG. 12 is an illustration for explaining that an each irradiation path for each of the powder layers is divided into a sub-irradiation with an unirradiated portion on both adjacent sides thereof and another sub-irradiation path with irradiated portion at an adjacent region thereto.

For example, depending on the form of the three-dimensional shaped object, an each irradiation path for each of the powder layers may be divided into a sub-irradiation path with the unirradiated portion on the both adjacent sides thereof and another sub-irradiation path with the irradiated portion at the adjacent region thereto. In other words, when a continuous and seamless path is regarded as a single scan path, and there are a plurality of the single scan paths, each of such single scan paths may be divided into the sub-irradiation path with the unirradiated portion on the both adjacent sides thereof and the another sub-irradiation path with the irradiated portion at the adjacent region thereto. Specifically, for example in a case where the irradiation region (i.e., a region for the formation of the solidified layer) is one as shown in FIG. 12, each of the single scan paths may be divided into a sub-irradiation path "A" with the unirradiated portion on the both adjacent sides thereof and a sub-irradiation path "B" with the irradiated portion at the adjacent region thereto, and thereby the light-beam condition for the sub-irradiation path "A" may be different from that for the sub-irradiation path "B". In this regard, the irradiation energy "$E_A$" for the sub-irradiation path "A" may be lower than the irradiation energy "$E_B$" for the sub-irradiation path "B". Alternatively, the irradiation power "$P_A$" for the sub-irradiation path "A" may be lower than the irradiation power "$P_B$" for the sub-irradiation path "B". By way of example only, the irradiation power "$P_A$" may be lower than the irradiation powers "$P_B$" under such a condition that the irradiation energies for the sub-irradiation paths "A" and "B" are the same as each other.

Another embodiment can be possible wherein an initial path is a path along a contour of a shaped-object forming region, whereas subsequent paths are located inside of the contour, each of the subsequent paths being adjacent to a prior path thereto (see FIG. 13). In this embodiment, it is preferred that the light-beam condition for the initial path along the contour of the shaped-object forming region is lower than that for each of the subsequent paths located inside of the contour, each of the subsequent paths being adjacent to the prior path thereto. For example, it is preferred that the irradiation energy "$E_{contour}$" for the initial path along the contour of the shaped-object forming region is lower than the irradiation energy "$E_{inside}$" for each of the subsequent paths located inside of the contour, each of the subsequent paths being adjacent to the prior path thereto. Alternatively, the condensing diameter of light beam for the initial path along the contour of the shaped-object forming region may be larger than that for each of the subsequent paths located inside of the contour, each of the subsequent paths being adjacent to the prior path thereto. Furthermore, the irradiation power "$P_{contour}$" for the initial path along the contour of the shaped-object forming region may be lower than the irradiation power "$P_{inside}$" for each of the subsequent paths located inside of the contour, each of the subsequent paths being adjacent to the prior path thereto. By way of example only, the irradiation power "$P_{contour}$" may be lower than the irradiation power "$P_{inside}$" under such a condition that the irradiation energy for the initial path along the contour of the shaped-object forming region is the same as that for each of the subsequent paths located inside of the contour.

Although a few embodiments of the present invention have been hereinbefore described, an embodiment of the present invention is not limited to these embodiments. It will be readily appreciated by those skilled in the art that various modifications are possible without departing from the scope of the present invention.

It should be noted that the present invention as described above includes the following aspects:

The first aspect: A method for manufacturing a three-dimensional shaped object by repetition of a powder-layer forming and a solidified-layer forming, the repetition comprising the steps of:
  (i) forming a solidified layer by irradiating a predetermined portion of a powder layer with a light beam, thereby allowing a sintering of the powder in the predetermined portion or a melting and subsequent solidification thereof; and
  (ii) forming another solidified layer by newly forming a powder layer on the resulting solidified layer, followed by the irradiation of a predetermined portion of the powder layer with the light beam,
  wherein a light-beam condition for an irradiation path having an unirradiated portion on both adjacent sides thereof is different from that for another irradiation path having an irradiated portion at an adjacent region thereto.

The second aspect: The method according to the first aspect, wherein the light-beam condition for at least an initial irradiation path for each of the powder layers is different from that for the other irradiation paths for the each of the powder layers.

The third aspect: The method according to the first or second aspect, wherein a light-beam irradiation energy for the irradiation path having the unirradiated portion on the both adjacent sides thereof is lower than that for the another irradiation path having the irradiated portion at the adjacent region thereto.

The fourth aspect: The method according to any one of the first to third aspects, wherein a light-beam irradiation power for the irradiation path having the unirradiated portion on the both adjacent sides thereof is lower than that for the another irradiation path having the irradiated portion at the adjacent region thereto. For example, the light-beam irradiation power for the irradiation path having the unirradiated portion on the both adjacent sides thereof is lower than that for the another irradiation path having the irradiated portion at the adjacent region thereto under such a condition that the irradiation energy for the irradiation path having the unirradiated portion on the both adjacent sides thereof is the same as that for the another irradiation path having the irradiated portion at the adjacent region thereto.

The fifth aspect: The method according to anyone of the first to fourth aspects, wherein an initial path is a path along a contour of a shaped-object forming region, whereas subsequent paths are located inside of the contour, each of the subsequent paths being adjacent to a prior path thereto, in which case the light-beam irradiation energy $E_1$ for the initial path is lower than that for each of the subsequent paths $E_{2, 3, 4 \ldots}$, and alternatively the light-beam irradiation power $P_1$ for the initial path is lower than that for each of the subsequent paths $P_{2, 3, 4} \ldots$.

The sixth aspect: The method according to anyone of the first to fifth aspects, wherein an each irradiation path for each of the powder layers is divided into a sub-irradiation path "A" having the unirradiated portion on the both adjacent sides thereof and a sub-irradiation path "B" having the irradiated portion at the adjacent region thereto, and the light-beam condition for the sub-irradiation path "A" is different from that for the sub-irradiation path "B".

INDUSTRIAL APPLICABILITY

The three-dimensional shaped object obtained by the manufacturing method according to an embodiment of the present invention can be used as various industrial articles. For example, in a case where the powder layer is a metal powder layer (i.e., inorganic powder layer) and thus the solidified layer corresponds to the sintered layer, the three-dimensional shaped object can be used as a metal mold for a plastic injection molding, a press molding, a die casting, a casting or a forging. While on the other hand in a case where the powder layer is a resin powder layer (i.e., organic powder layer) and thus the solidified layer corresponds to the cured layer, the three-dimensional shaped object can be used as a resin molded article.

CROSS REFERENCE TO RELATED PATENT APPLICATION

The present application claims the right of priority of Japanese Patent Application No. 2012-52503 (filed on Mar. 9, 2012, the title of the invention: "METHOD FOR MANUFACTURING THREE-DIMENSIONAL SHAPED OBJECT"), the disclosure of which is incorporated herein by reference.

EXPLANATION OF REFERENCE NUMERALS

1 Laser-sintering/machining hybrid machine
2 Powder layer forming means
3 Light-beam irradiation means
4 Machining means
19 Powder/powder layer (e.g., metal powder/metal powder layer or resin powder/resin powder layer)
20 Forming table (i.e., supporting table)
21 Base plate for shaped object
22 Powder layer (e.g., metal powder layer or resin powder layer)
23 Squeegee blade
24 Solidified layer (e.g., sintered layer or cured layer) or three-dimensional shaped object obtained therefrom
25 Powder table
26 Wall of storage tank for powder material
27 Wall of forming tank
28 Storage tank for powder material
29 Forming tank
30 Light beam generator
31 Galvanometer mirror
32 Reflecting mirror
33 Collecting lens
40 Milling head
41 X-Y actuator
41a X-axis actuator
41b Y-axis actuator
42 Tool magazine
50 Chamber
52 Window for transmission of light
L Light beam

The invention claimed is:

1. A method for manufacturing a three-dimensional shaped object by repetition of a powder-layer forming and a solidified-layer forming, the repetition comprising the steps of:

(i) forming a solidified layer by irradiating a predetermined portion of a powder layer with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam, wherein a discrimination on the light-beam irradiation is made whether a scan path of the light-beam corresponds to an irradiation path with an unirradiated portion on both adjacent sides thereof, or another irradiation path with an irradiated portion at an adjacent region thereto, and wherein a light-beam irradiation energy for the irradiation path with the unirradiated portion on the both adjacent sides thereof is lower than that for the another irradiation path with the irradiated portion at the adjacent region thereto.

2. The method according to claim 1, wherein a light-beam irradiation power for the irradiation path with the unirradiated portion on the both adjacent sides thereof is lower than that for the another irradiation path with the irradiated portion at the adjacent region thereto.

3. The method according to claim 1, wherein the light-beam irradiation energy for at least an initial irradiation path for each of the powder layers is lower than that for the other irradiation paths for the each of the powder layers.

4. The method according to claim 2, wherein an initial path is a path along a contour of a shaped-object forming region, whereas subsequent paths are located inside of the contour, each of the subsequent paths being adjacent to a prior path thereto, in which case the light-beam irradiation energy or power for the initial path is lower than that for each of the subsequent paths.

5. The method according to claim 1, wherein an each irradiation path for each of the powder layers is divided into a sub-irradiation path "A" with the unirradiated portion on the both adjacent sides thereof and a sub-irradiation path "B" with the irradiated portion at the adjacent region thereto, and the light-beam irradiation energy for the sub-irradiation path "A" is lower than that for the sub-irradiation path "B".

* * * * *